United States Patent
Ivo et al.

(10) Patent No.: US 9,409,227 B2
(45) Date of Patent: Aug. 9, 2016

(54) METHOD AND DEVICE FOR FEEDING FASTENERS

(75) Inventors: Hubert Ivo, Giessen (DE); Joachim Moeser, Giessen (DE); Stefan Lippert, Giessen (DE); Alexander Pohl, Giessen (DE); Reinhold Opper, Giessen (DE)

(73) Assignee: NEWFREY LLC, Newark, DE (US)

( * ) Notice: Subject to any disclaimer, the term of this patent is extended or adjusted under 35 U.S.C. 154(b) by 913 days.

(21) Appl. No.: 13/475,693

(22) Filed: May 18, 2012

(65) Prior Publication Data

US 2012/0301262 A1  Nov. 29, 2012

(30) Foreign Application Priority Data

May 27, 2011 (DE) .......................... 10 2011 103 332

(51) Int. Cl.
 *B65G 65/32* (2006.01)
 *B21J 15/32* (2006.01)
 *B23P 19/00* (2006.01)

(52) U.S. Cl.
 CPC ............... *B21J 15/32* (2013.01); *B23P 19/005* (2013.01)

(58) Field of Classification Search
 CPC ..... B65G 65/32; A41H 37/02; A43D 100/02; B23P 19/005; B23P 19/001; B21J 15/32; B21J 15/18; B21J 15/36; Y10T 29/49956
 USPC ........ 414/788, 801; 227/15, 139, 149; 406/72
 See application file for complete search history.

(56) References Cited

U.S. PATENT DOCUMENTS

| | | | |
|---|---|---|---|
| 2,932,422 A | 4/1960 | Harrigan | |
| 4,208,153 A | 6/1980 | Trethewy | |
| 6,944,944 B1* | 9/2005 | Craythorn et al. | 29/798 |
| 2009/0266866 A1* | 10/2009 | Davies et al. | 227/139 |

FOREIGN PATENT DOCUMENTS

| | | |
|---|---|---|
| CN | 1320065 A | 10/2001 |
| CN | 1668419 A | 9/2005 |
| CN | 201473055 U | 5/2010 |
| DE | 102005015032 | 10/2006 |
| DE | 10 2009 025 283 A1 | 12/2010 |
| JP | 2007-007731 A | 1/2007 |
| JP | 2009-507649 A | 2/2009 |
| WO | WO 2006/103263 A1 | 10/2006 |
| WO | WO 2007/132195 | 11/2007 |

OTHER PUBLICATIONS

First Office Action issued in Chinese Patent Application No. CN 201280025988.6, dated Oct. 29, 2014.
Search Report and Written Opinion of the International Searching Authority as issued for International Appln. No. PCT/EP2012/058772, dated Nov. 2, 2012.
Notice of Allowance as issued for European Patent Application No. 12720499.8, dated Dec. 17, 2013.
International Report on Patentability as issued for International Application No. PCT/EP2012/058772, dated Dec. 12, 2013.
Notification of Reason for Rejection as issued in Japanese Patent Application No. 2014-511810, dated Nov. 2, 2015.

* cited by examiner

*Primary Examiner* — Robert Long
*Assistant Examiner* — Xavier A Madison
(74) *Attorney, Agent, or Firm* — Pillsbury Winthrop Shaw Pittman LLP

(57) ABSTRACT

Method for feeding fasteners to a fastening tool that can be moved by a programmable handling device and on which is mounted a magazine for accommodating at least one fastener. The method comprises: moving the magazine to a filling station, wherein the filling station has an always continuously open tube section with an outlet opening; orienting the magazine with respect to the outlet opening; opening an air seal of the magazine; and conveying at least one fastener to the tube section in such a manner that the fastener travels through the tube section and the outlet opening to reach the magazine.

33 Claims, 5 Drawing Sheets

METHOD AND DEVICE FOR FEEDING FASTENERS

CROSS-REFERENCE TO RELATED APPLICATIONS

This application claims priority to German Patent Application No. 102011103332.0, filed May 27, 2011, the content of which is incorporated herein by reference in its entirety.

FIELD

The present invention concerns a method for feeding fasteners to a fastening tool that can be moved by means of a programmable handling device and on which is mounted a magazine for accommodating at least one fastener.

In addition, the present invention concerns a device for fastening by means of fasteners, wherein the fastening device can be set up to carry out the abovementioned feeding method.

BACKGROUND

In the field of fastening technology, it is known to make joints using fasteners. These methods include, for example, the fastening of fasteners to workpieces, wherein the fasteners in this case are oftentimes used as anchors for further attachment. Such fastening methods are known in the form of stud welding, adhesive stud bonding, and thermoplastic stud fastening. In these methods, the studs may be rotationally symmetric fasteners, but may also be irregularly shaped anchors.

In addition, it is known to join at least two workpieces to one another by means of fasteners. Such methods include, e.g., riveting methods, for instance the self-piercing riveting method.

Especially in the field of automotive engineering, such fastening methods have been well-established for some years, particularly in body manufacture.

In general, it is possible to carry out these fastening methods manually. In doing so, fastening tools, which often have a pistol-type grip, are controlled by hand. However, in high-volume production it is preferred to move the fastening tools by means of a programmable handling device, such as a robot. In this case it is likewise preferred for the fasteners to be fed to a fastening tool attached to a robot arm. To this end, it is known to connect the fastening tool to a feed device by a feed hose. A proven method for feeding fasteners in this context includes feeding the fasteners through the feed hose by means of compressed or blast air.

Another prior art system connects the feed device to a docking station by a feed hose. In this case, a buffer for accommodating a plurality of fasteners is present on the fastening tool. In order to fill the magazine, the fastening tool is moved to the docking station where it is docked. The docking in this process is done in such a manner that both an outlet gate in the region of the docking station and an inlet gate of the buffer are opened mechanically by the docking procedure in order to establish a continuous connection between the feed device and the buffer. The expense this necessitates for mechanical actuators or transmissions is considerable. In addition, docking and undocking is a relatively time-consuming process.

SUMMARY

Against this background, it is an object of the present invention to specify an improved method for feeding fasteners to a fastening tool and to specify an improved fastening device.

This object is attained according to a first aspect of the invention by a method for feeding fasteners to a fastening tool that can be moved by a programmable handling device and on which is mounted a magazine for accommodating at least one fastener, having the steps of: moving the magazine to a filling station, wherein the filling station has a permanently continuous tube section with an outlet opening; orienting the magazine with respect to the outlet opening; opening an air seal of the magazine; and conveying, at least one fastener to the tube section in such a manner that the fastener travels through the tube section and the outlet opening to reach the magazine.

In addition, the above object is attained by a device for fastening by fasteners, in particular for carrying out the abovementioned feeding method, having a fastening tool that can be moved by means of a programmable handling device, a magazine for accommodating at least one fastener mounted on the fastening tool, wherein the magazine has an inlet port and at least one air seal, a filling station that has a feed port that can be aligned with a feed device for feeding at least one fastener at a time and that has an exit port through which the fasteners can be fed to the magazine, wherein the feed device is set up to feed at least one fastener to the filling station when the inlet port of the magazine is aligned with the exit port and when the air seal is open, wherein the filling station has a permanently continuous tube section between the feed port and the exit port.

The method according to various embodiments has a filling station that has a permanently continuous tube section. Consequently, the filling station can have no exit gate that would block fasteners from exiting the filling station. As a result, the filling station can be designed to be significantly less complex mechanically.

In addition, no inlet gate is provided at the magazine, also to facilitate filling of fasteners at the filling station. In order to prevent fasteners from exiting the filling station unhindered, a query as to whether an inlet port of the magazine is aligned with the exit port of the filling station is performed prior to initiation of a conveying or feeding step. In one embodiment, an additional query is performed as to whether the air seal of the magazine is open. In one embodiment, the process of conveying or feeding one or more fasteners by means of the feed device is not initiated until these conditions are fulfilled. A valve function may be integrated into the air seal.

As a result of the fact that there is no need for the presence in the filling station of actuating or transmission elements that can be mechanically moved by the docking process, both the process of moving the magazine to the filling station and the process of moving the magazine away from the filling station can be performed faster.

The programmable handling device may be a robot, for example, to which the fastening tool is irremovably attached. In this design, the magazine may be mounted on the fastening tool either removably or irremovably. In addition, the fastening tool may be removably attached to the handling device. Consequently, the moving of the magazine to the filling station may include, in a first alternative, moving the fastening tool with the magazine mounted thereon to the filling station. Alternatively, it is possible to temporarily remove the magazine from the fastening tool and move it separately to a filling station. According to another alternative, it is possible to remove the fastening tool from the handling device and to move only the handling device with the magazine to a filling station.

In the method according to the first aspect, a sensor arrangement can be used to detect whether the magazine has approached the exit port of the filling station, wherein the conveying step is only initiated when this is the case.

In this design, the sensor arrangement can detect strictly an approach of the magazine to the filling station, but can also detect whether the magazine is aligned with respect to the exit port. The sensor arrangement may be a simple sensor arrangement, for example in the form of an optical, magnetic, or electric sensor. In the simplest case, it may also be a contact or a switch. In some embodiments, at least two separate sensors detect the approach of the magazine to the filling station in order to achieve a certain redundancy.

According to another embodiment, whether the magazine has reached the filling station is detected by a switch, wherein the conveying step is only initiated when the magazine has reached the filling station.

The switch may be designed as a limit switch, for example. Accordingly, the switch can be connected to a device that prevents conveying of a fastener to the tube section when the switch is not activated. Reaching the filling station can mean that the magazine physically actuates the switch, thus touches the filling station, for example. Alternatively, reaching the filling station can also mean that a certain position of the magazine with the respect to the filling station is detected in a non-contacting manner.

In addition, if the alignment of the magazine with respect to the exit port includes instantaneously inserting at least one alignment pin of the magazine in an alignment opening of the filling station.

It is thus possible to ensure that the exit port can always be aligned precisely with an inlet port of the magazine.

In this embodiment, the alignment pin can be withdrawn out of the alignment opening before the air seal of the magazine is opened, but at least before the actual feeding step is carried out.

In the simplest case, the relative position between the filling station and the magazine can be held by the programmable handling device in this process. Because there is no connection between the filling station and magazine, the process of removing the fastening tool from the filling station can be carried out faster. If desired, more direct curves between the filling station and a subsequent fastening location can be programmed for the handling device.

In general, it is indeed possible to provide an alignment pin on the filling station and an alignment opening on the magazine. However, the provision of a movable alignment pin on the magazine makes it so that no mechanically movable parts need to be provided in the filling station for the purposes of alignment.

In addition, the magazine can be movably mounted with respect to the fastening tool and for the alignment of the magazine with respect to the exit port to include moving the magazine with respect to the fastening tool. In this design the direction Of displacement is parallel to the feed direction. In this way tolerances can be compensated in a direction parallel to the feed direction, for example. In other words, the handling device does not need to approach the longitudinal position at the filling station as precisely.

In one embodiment, the magazine can be preloaded in one direction of displacement with respect to the fastening tool and for the aligning of the magazine relative to the exit port to include moving the magazine against the preloading with respect to the fastening tool, so that the magazine can be held by the programmable handling device and the preloading force with respect to the filling station while the fastener is traveling from the tube section into the magazine.

In other words, a relatively rough position can be approached in the longitudinal direction by the handling device. In this process, the magazine is pressed against the filling station by means of the preloading. It is not necessary here to mechanically couple the magazine and the filling station with one another in the manner of a docking station. The magazine is merely pressed against the filling station in the longitudinal direction.

In the case of a movable mounting of the magazine with respect to the fastening tool, the magazine can be able to be fixed in a displacement position relative to the fastening tool by a stop mechanism.

In this way, it is possible to prevent the magazine from moving relative to the fastening tool during relatively rapid motions of the fastening tool during the execution of fastening processes or during the trajectories to be traversed between individual fastening processes. Through the stop mechanism, the magazine can be fixed in place so that the magazine is subjected to less mechanical stress during such rapid motions of the fastening tool.

It is self-evident here that the stop mechanism can be released prior to aligning the magazine with the filling station and change back to the locked state immediately after release from the filling station.

In one embodiment, a stop pin or bar can be attached to the alignment pin.

In this embodiment, it is possible to actuate the alignment pin and the stop bar by a single actuator so that the hardware expense can be reduced. Alternatively, however, it is also possible for a stop mechanism and for the alignment pin to each be provided with individual actuators.

In the fastening device according to the second aspect, a sensor arrangement can detect whether the magazine has approached the filling station to be located on the filling station.

As described above, the sensor arrangement can be configured to detect the approach and/or to detect the alignment of the magazine with the filling station.

In addition, in one embodiment a switch is actuated when the magazine has reached the filling station to be located on the filling station.

As described above, such a switch can be designed as a limit switch.

The magazine can also be elastically preloaded in one direction of displacement in such a manner that a magazine plate can be pressed against a filling station plate when the exit port is aligned with the inlet port in order to hold the relative position between the magazine and the filling station while at least one fastener is being fed through the tube section into the magazine.

In addition, in one embodiment, the magazine is capable of being fixed in a displacement position relative to the fastening tool by a stop mechanism.

As the magazine is approaching the filling station, the stop mechanism is released, so that relative movability can be achieved. When the magazine moves away from the filling station again, the stop mechanism is actuated in order to fix the magazine in place with respect to the fastening tool.

In one embodiment, the air seal of the magazine is capable of being actuated by an electrically drivable air seal actuator.

In this embodiment, a magazine gate is not provided, and thus there is no mechanical opening of a gate required by a docking process at a docking station. In this embodiment the opening of the air seal is provided to admit fasteners.

Subsequently, the air seal is closed to enable compressed gas to transport fasteners in the magazine after they have been delivered to the magazine. The opening and closing of the seal takes place through a separate process by which the air seal actuator is operated. Thus, it is possible to carry out the opening and closing of the air seal to the magazine as a function of a detection of specific states by a sensor. For example, the process for operating the air seal actuator can wait for a signal from a proximity sensor, which confirms that the magazine has approached the filling station. In addition, the opening of the air seal can take place as a function of a signal from a sensor arrangement that ascertains whether an exit port of the filling station is aligned with an inlet port of the magazine.

In addition, in one embodiment, at least one alignment pin is mounted on a magazine plate of the magazine, which pin can be inserted in an associated alignment opening of the filling station in order to align the magazine and the filling station with one another.

The alignment in this context takes place primarily in a direction transverse to a feed direction of the fasteners.

The alignment pin can be oriented parallel to the feed direction here.

The alignment pin may also be rigidly attached to the magazine plate.

In one embodiment, the alignment pin is mounted such that it can be moved relative to the magazine plate of the magazine by an alignment actuator.

In one embodiment, the alignment pin can be movable by an electrically operated alignment actuator between a first position in which it projects relative to a contact surface of the magazine plate, and a second position in which it essentially does not project relative to the contact surface.

In this way the alignment pin can be drawn back to the second position once alignment has been achieved. In this way it is possible for travel of the magazine or fastening tool away from the filling station to take place faster, since mechanical release of docking transmissions and the like is not necessary.

In one embodiment, the alignment pin is drawn back to the second position by the alignment actuator even before fasteners are fed to the magazine. Doing so achieves the result that essentially no connection is established between the magazine plate and a filling station plate during the actual feeding process. In one embodiment, the magazine plate can be pressed against the filling station plate only by a mechanical preloading (for example, springs).

In one embodiment, the alignment pin is connected to a stop pin that fixes the magazine in place with respect to the fastening tool when the alignment pin is in the second position.

As described above, in this embodiment the alignment pin and the stop pin or bar can be actuated by a single combination actuator.

It is self-evident that it is not only possible to employ the features specified above and those explained below in the combinations described, but also in other combinations or alone, without departing from the scope of the present invention.

BRIEF DESCRIPTION OF THE DRAWINGS

Exemplary embodiments of the invention are shown in the drawings and will be explained in detail in the description below. They show.

DETAILED DESCRIPTION

Figure 1:
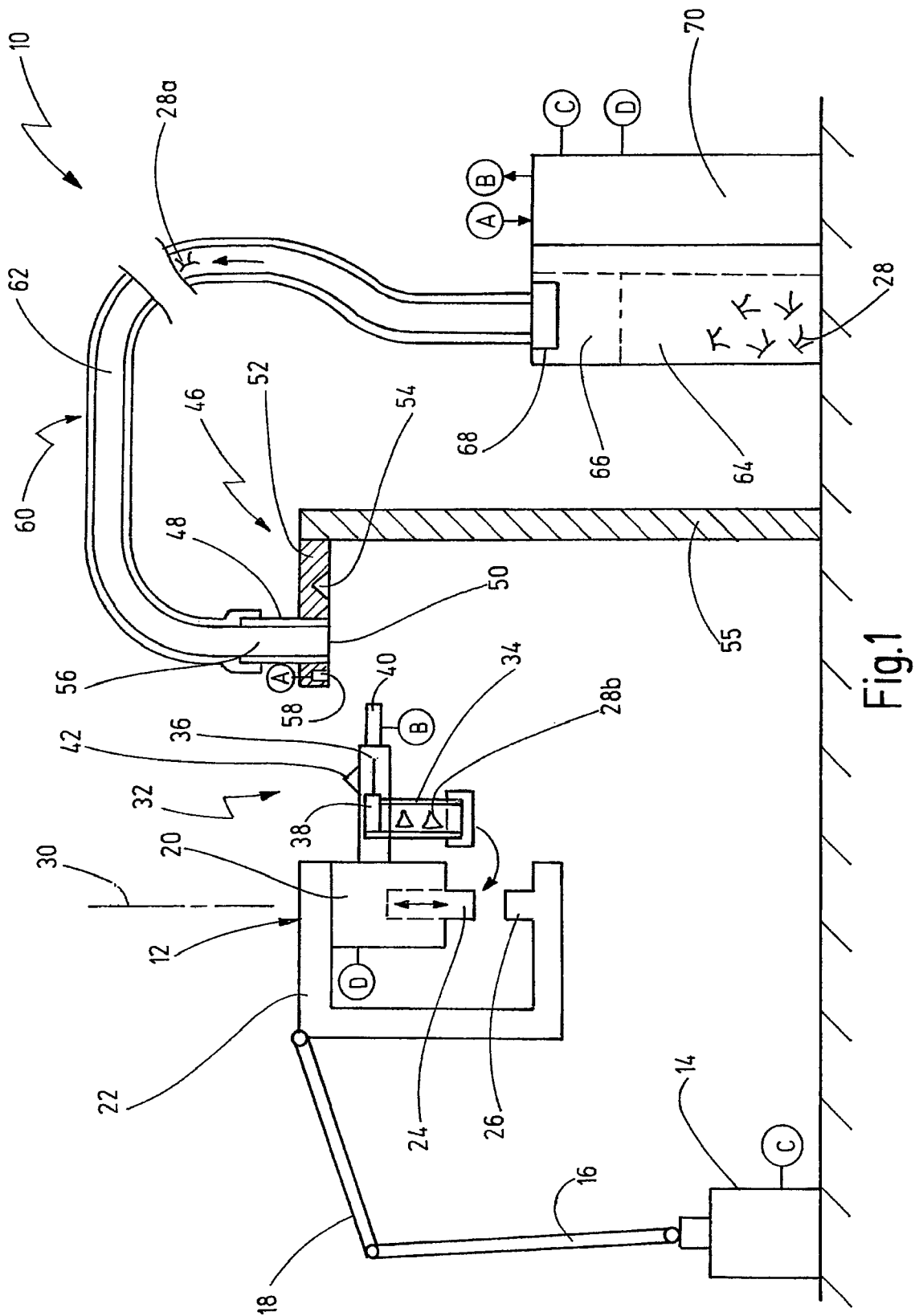
FIG. 1 a schematic representation of an embodiment of a fastening system.

In FIG. 1, an embodiment of a fastening system for producing joints using fasteners is labeled overall with 10. In the present case, the fastening system 10 is designed especially for self-piercing riveting. However, the fastening system 10 may also be designed in corresponding fashion to produce stud joints (stud welding, adhesive stud bonding, etc.), for example.

The fastening system 10 has a fastening head 12, which is attached to a programmable handling device in the form of a robot 14. More precisely, the robot 14 has, for example, a first arm 16 and a second arm 18, wherein the fastening head 12 is affixed to the second arm 18.

Affixed to the fastening head 12 is a fastening tool 20 in the form of a self-piercing riveting tool. The fastening tool 20 includes a C-frame 22. Mounted on an upper end of the C-frame 22 is a die 24—that can move in a fastening direction—of the fastening tool 20. Affixed to the other end of the C-frame 22 is an anvil 26.

The fastening tool 20 is designed to produce joints using fasteners 28. The fasteners 28 in the present case are self-piercing rivet elements, in particular tubular self-piercing rivets.

For example, two or more workpieces (in the form of sheets made of the same or different materials, for example) can be inserted between the die 24 and the anvil 26. Then a joining of these workpieces takes place by the means that a self-piercing rivet element is pressed into the workpiece arrangement by means of the die 24. In the case of a tubular self-piercing rivet, a hollow section that was originally essentially cylindrical spreads apart radially in this process so that an undercut occurs within the workpiece arrangement. Self-piercing riveting processes of this type are generally known.

The motion of the die 24 generally takes place along a fastening axis 30.

Affixed to the fastening tool 20 or the fastening head 12 is a magazine arrangement 32. The magazine arrangement 32 has a magazine 34 for accommodating at least one, preferably a plurality of fasteners 28, of which one is labeled 28*b* by way of example in FIG. 1.

The magazine arrangement 32 additionally has a magazine plate 36 that preferably extends in a direction transverse to the fastening axis 30 and preferably is permanently attached to the magazine 34. Provided in the region of the magazine plate 36 is an air seal 38, which can be actuated by means of a air seal actuator 40. The air seal actuator 40 can move the air seal 38 from a closed position shown in FIG. 1 into an open position in which the fasteners 28 can be fed to the magazine 34.

Provided on a top side of the magazine plate 36 is an alignment pin 42, which extends upward from an upper contact surface of the magazine plate 36.

The fastening system 10 additionally has a filling station 46. The filling station 46 has a tube section 48, which includes an exit port 50. In addition, the filling station 46 has a filling station plate 52, to which the tube section 48 is affixed in such a manner that the exit port 50 is aligned essentially flush with a contact surface that is not specifically labeled of the filling station plate 52. Also implemented in the contact surface of the filling station plate 52 is an alignment opening 54, into which the alignment pin 42 can be inserted. The filling station plate 52 is arranged in a stationary location in the region of the range of the handling device 14 by means of a support 55.

The tube section 48 additionally has a feed port 56. The tube section 48 is designed such that it is permanently continuous between the feed port 56 and the exit port 50. In other words, no locking bars or the like, which could hinder or block passage through the tube section 48, are provided in the region of the filling station 46.

Also affixed to the filling station 46, in particular to the filling station plate 52, is a sensor arrangement 58. The sensor arrangement 58 can detect whether the magazine 34 has approached the filling station 46. Preferably the sensor arrangement 58 can detect when the magazine plate 36 is contacting the filling station plate 52, wherein the alignment pin 42 engages in the alignment opening 54 so that an alignment of the two plates has been achieved in a direction transverse to an axis of the tube section 48 or of the magazine 34. In the aligned position, an inlet port, which is not specifically labeled, of the magazine 34 and the outlet port 50 of the tube section 48 are aligned with one another.

The feed port 56 of the tube section 48 is connected to a feed hose 62 of a feed device 60. The feed device 60 includes a stationary reservoir 64 for accommodating a plurality of fasteners 28. In addition, the feed device 60 includes a singulation device 66, in which the fasteners are singulated. Finally, the feed device 60 includes a conveyor device, in particular in the form of a compressed air system 68. By means of the compressed air system 68, fasteners 28 can be conveyed through the feed hose 62 to the filling station 52, as is shown schematically with 28a in FIG. 1.

The fastening system 10 also includes a control device 70. The control device 70 is designed to control various individual processes and individual devices of the fastening system 10. In addition, the control device 70 also serves to supply power as appropriate. For example, it is shown that the control device 70 is connected to the sensor arrangement 58. In addition, the control device 70 is designed to actuate the air seal actuator 40. Furthermore, the control device 70 is preferably also designed to control the robot 14 in accordance with a specific program. In addition, the control device 70 is also connected to the fastening tool 20 and designed, for example, to operate the die 24. In this context, the control device 70 can be connected to the robot 14 and/or the fastening head 12 by a cable arrangement. In addition, the control device 70 can be connected to the filling station 46 by a cable arrangement, in particular in the form of an individual sensor cable.

The fastening system 10 operates as follows. This is starting from a state in which a plurality of fasteners 28 are accommodated in the magazine 34. In this process, the robot 14 moves the fastening head 12 to a fastening position where workpieces that are to be joined to one another are located between the die 24 and the anvil 26. Then a fastener 28 is removed from the magazine 34, as is indicated schematically in FIG. 1 by an arrow. This removal can take place manually, but can also take place by an automated transfer device, which is controlled by the control device 70, for example.

First the die 24 is moved, in order to carry out the actual fastening process. Then the die 24 travels back to its initial position, and the fastening head 12 is moved to a next fastening position. As soon as only few or no fasteners 28b are present in the magazine 34, the fastening head 12 is moved to the filling station 46. The number of fasteners 28b located in the magazine 34 can be monitored by a sensor arrangement. However, it is preferred for the number of fasteners 28 located in the magazine 34 to always be known by a control unit in the control device 70 that maintains a count.

As soon as the magazine plate 36 has approached the filling station plate 52, and the exit port 50 is aligned with an inlet port of the magazine 34, the air seal actuator 40 is actuated in order to open the air seal 38. Then a fastener 28 or a plurality of fasteners 28 is conveyed by the compressed air system 68 from the singulation device 66 to the magazine 34 without hindrance, which is to say through the feed hose 62 and the tube section 48 without hindrance.

As soon as the magazine 34 is filled again, the air seal 38 is closed again by means of the air seal actuator 40 to provide a gas seal to allow for further transmission of fasteners, and the feed device 60 is locked so that further conveying of fasteners 28 to the exit port 50 is prevented.

Subsequently, the fastening head 12 travels away from the filling station 46 and again carries out further fastening processes.

In the figures that follow, alternative embodiments of fastening systems or feed devices and magazine arrangements are shown which generally correspond to the corresponding elements of the fastening system 10 in FIG. 1 with regard to structure and function. Consequently, like elements are labeled with like reference characters. Primarily the differences are explained below.

Figure 2:
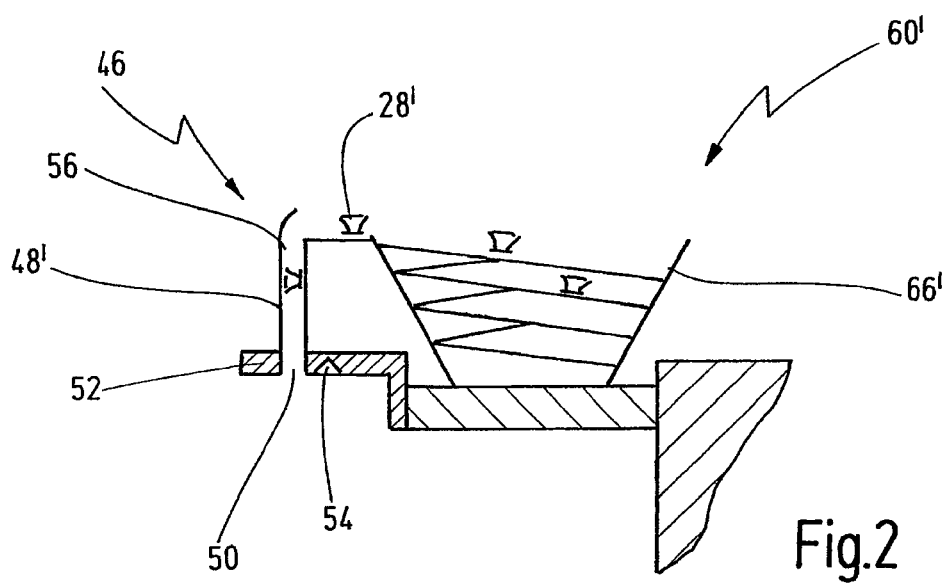
FIG. 2 a detail view of an alternative embodiment of a feed device for such a fastening system.

FIG. 2 shows an alternative embodiment of a feed device 60'. In this design, the feed device 60' has a singulation device 66', in which the fasteners 28' are conveyed individually towards the feed port 56 of the tube section 48' and subsequently fall through the tube section 48' to the exit port 50 on account of gravitational forces. It is self-evident here that the singulating and conveying of fasteners 28' towards the feed port 56 takes place as a function of whether the magazine plate 36 has approached the filling station plate 52 or the exit port 50 is aligned with an inlet port of the magazine 34. In this embodiment, it is not necessary to provide a compressed-air-operated feed hose 62.

Figure 3:
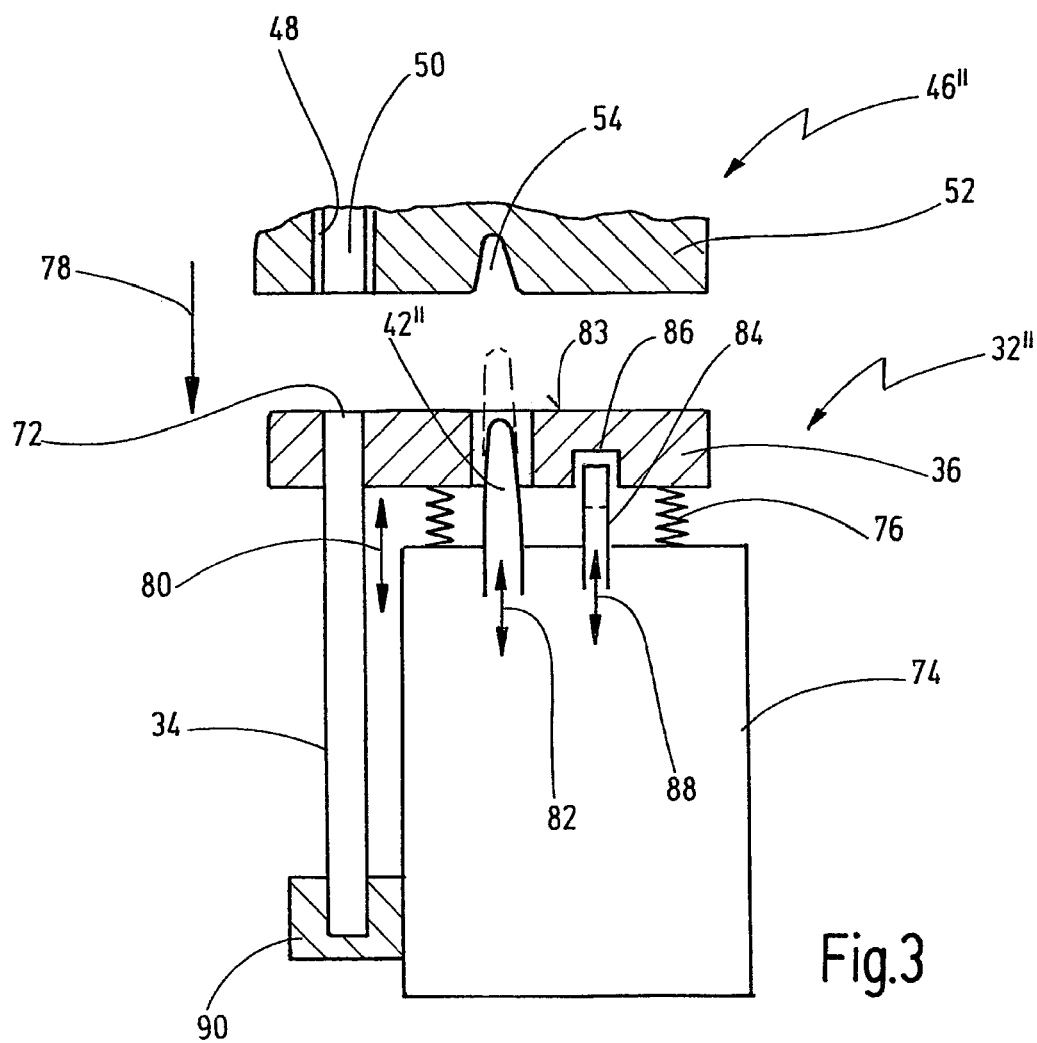
FIG. 3 an alternative embodiment of a magazine arrangement for such a fastening system.

Shown in schematic form in FIG. 3 is an alternative embodiment of a magazine arrangement 32" and a filling station 46".

The magazine arrangement 32" has a magazine 34, which is rigidly attached to a magazine plate 36. An inlet port 72 of the magazine 34 is aligned essentially flush with a contact surface of the magazine plate 36 in this design. The magazine arrangement 32" additionally has an actuator housing 74. The magazine plate 36, along with the rigidly attached magazine 34, is mounted to be movable relative to the actuator housing 74. The actuator housing 74 is shaped to be affixed to the fastening head 12 or the fastening tool 20.

The magazine plate 36 in this design is preloaded relative to the actuator housing 74 by means of a plurality of springs, specifically in a direction away from the actuator housing 74. The springs are schematically shown at 76 in FIG. 3.

Also shown in FIG. 3 is a feed direction 78, wherein the magazine 34 is oriented essentially parallel to the feed direction 78. The movable mounting of the magazine plate 36 with respect to the actuator housing 74 is possible in a direction of displacement that is labeled 80 in FIG. 3 and is oriented parallel to the feed direction 78.

The magazine arrangement 32" has an alignment pin 42", which can be moved by means of an alignment actuator 82. In this design, the alignment pin 42" can be moved between a first position, shown with dashed lines, and a second position shown with solid lines in FIG. 3. In the first position, the alignment pin 42" instantaneously projects with respect to a contact surface 83 of the magazine plate 36. In the second position, the alignment pin 42" does not project with respect to the contact surface 83. A recess that is not labeled in FIG. 3 is formed in the magazine plate 36 for passage of the alignment pin 42", wherein the opening is implemented as a through-hole.

The alignment actuator 82 is accommodated in the actuator housing 74.

In addition, the magazine arrangement 32 has a stop mechanism. The stop mechanism includes a stop bar 84, which can be actuated by means of a stop actuator 88. In this design, the stop bar 84 can be moved between a first stop position, in which the stop bar 84 engages in a stop recess 86 (for example, a blind hole) in the magazine plate 36, and a second position in which the stop bar 84 is drawn out of the stop recess 86.

In the first position, a fixing in place of the magazine plate 36 relative to the actuator housing 74 can be accomplished, so that the magazine plate 36 is no longer movable in the displacement direction 80 with respect to the actuator housing 74. In the second position, the stop bar 84 is drawn out of the stop recess 86, so that the magazine plate 36 can move against the preloading of the springs 76 in the direction of displacement 80 with respect to the actuator housing 74.

FIG. 3 also schematically shows a delivery device 90, which is located at the end of the magazine 34 opposite the inlet port 72. The delivery device 90 can serve to transfer individual fasteners 28 from the magazine 34 to the fastening tool 20, for example into a holding device of the fastening too 20 that is aligned axially with the die 24.

For reasons of clarity, the air seal 38 is not shown in FIG. 3.

The alignment actuator 82 and the stop actuator 88 act in directions parallel to the direction of displacement 80. The air seal actuator 40, the alignment actuator 82, and the stop actuator 88 can each be operated by the control device 70. The alignment actuator 82 and the stop actuator 88 may also be composed of a single combination actuator, as described further below. Where applicable, the control device 70 may include a decentralized control unit on the fastening head 12.

Said actuators may be pneumatic actuators, hydraulic actuators, or electric actuators such as electric motors. All actuators preferably can be driven electrically.

Figure 4:
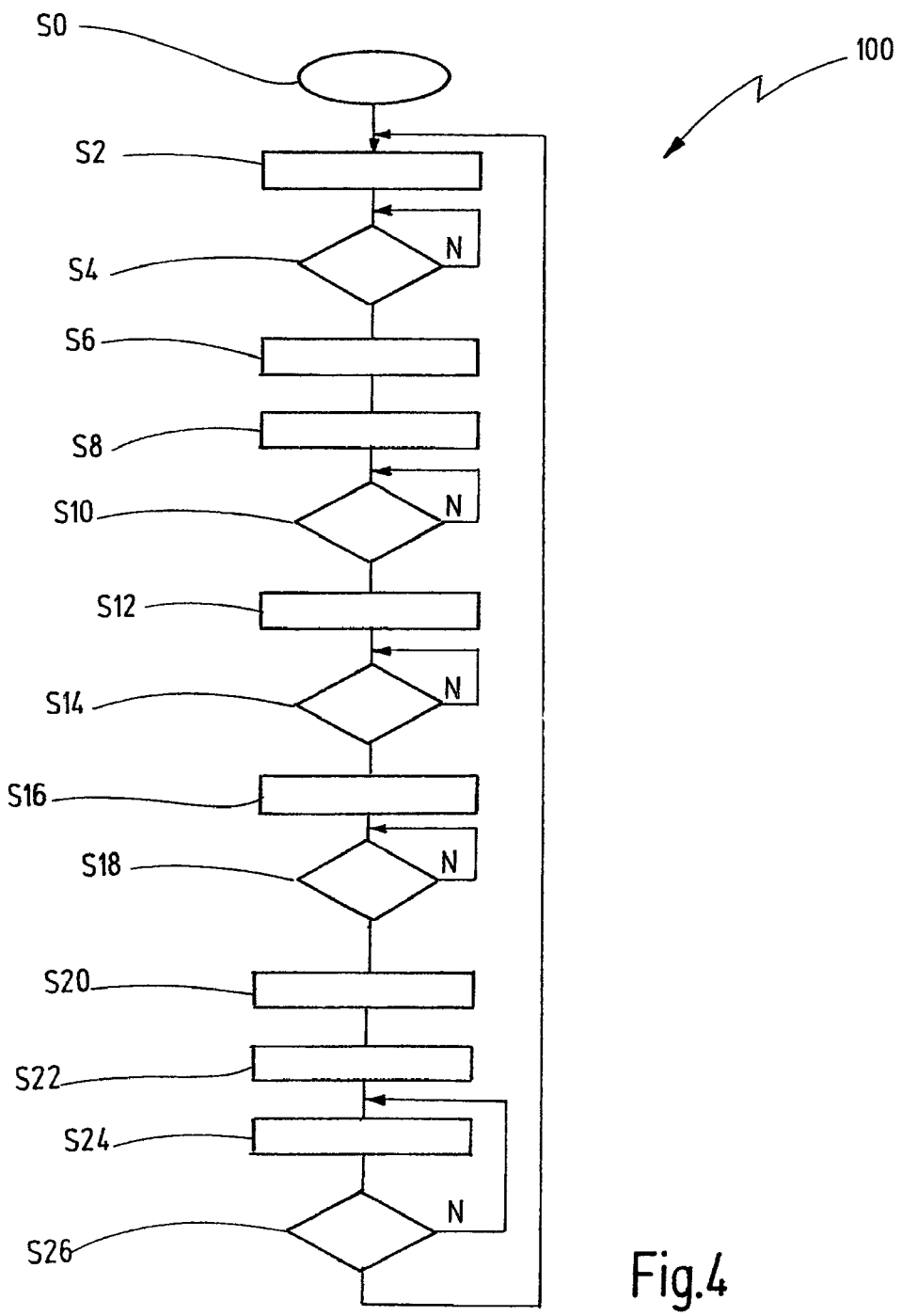
FIG. 4 a flowchart to explain a feed method according to a first aspect of the present application.

Shown in FIG. 4 and labeled overall with 100 is a flowchart of a simplified method for operating the fastening system 10, in particular the feed device 60 of the above-described embodiment. The program 100 is invoked in a step S0 when the magazine 34 needs to be refilled.

In a first step S2, preparation steps take place, such as extending the alignment pin 42 into the first position and/or moving the stop mechanism 84, 86 out of the stop position. In the case that a combination actuator is used (see above), the step S2 can be a single step of operating this combination actuator.

In a next step S4, a query is made as to whether the magazine arrangement 32 has approached the filling station 46. Preferably, a query is also made here as to whether the exit port 50 is aligned with an inlet port 72 of the magazine 34. This can be assumed on the basis of the alignment pin 42 if the magazine arrangement 32" has approached the filling station 46 closely enough. The query can also be accomplished, for instance, by the means of sensing when the fastening head 12 is located in a certain position relative to the filling station 46. In one embodiment, however, a signal from a sensor arrangement 58 is also queried in this step.

As soon as the approach or alignment has been accomplished, the feed device 60 is unlocked in a step S6 (in particular, unlocked by safety means). In addition, the alignment pin 42" can be drawn back into the second position in the embodiment from FIG. 3.

In a subsequent step S8, controlled by the control device 70, the air seal 38 of the magazine 34 is opened.

This is queried in a step S10.

In a step S12, as soon as the air seal 38 has been opened, at least one fastener 28 is conveyed by means of the feed device 60 from the singulation device 66 through the tube section 48 into the magazine 34 in a feed step.

In a next step S14, a query is made as to whether the conveying step is completed and as to whether a sufficient number of fasteners 28 has been conveyed into the magazine 34.

If this is the case, the air seal 38 of the magazine 34 is closed in step S16. This is queried in step S18.

As soon as the air seal 38 has been closed, which is to say the query in step S18 is answered in the affirmative, the feed device 60 is locked in a subsequent step S20. The locking of the feed device includes, in particular, the locking of a conveying device of the feed device 60, thus, for instance, the locking of the compressed air system 68 from FIG. 1. To this end, a valve in the compressed air system 68 can be locked.

It is only once this has been accomplished that the step of removing the fastener head 12 with the magazine 34 from the filling station 46 takes place in a step S22. In step S22, a fixing of the magazine plate 36 as in FIG. 3 may also take place directly, in that the stop actuator 88 presses the stop bar 84 into the stop recess 86.

In an embodiment in which a limit switch is queried, the locking of the feed device 60 (as described above) takes place directly with the state change of this limit switch. An embodiment of this nature is described further below.

In a following step S24, a fastening process is performed.

In a next step S26, a query is made as to whether the magazine 34 needs to be filled. If not, another fastening process is performed in step S24. If yes, the program returns to step S2.

In FIGS. 5 through 8, another embodiment of a fastening system 10''' is shown that generally corresponds to the fastening system 10 in FIG. 1 and the magazine arrangement 32 from FIG. 3 with regard to structure and function. Consequently, like elements are labeled with like reference characters. Primarily the differences are explained below.

Thus, the magazine arrangement 32''' does not have a single magazine 34, but rather two magazines 34a, 34b arranged approximately parallel to one another, which may be configured for identical fasteners or for different fasteners. In corresponding fashion, the filling station 46''' has a first tube section 48a and a second tube section 48b, wherein these tube sections can be aligned with inlet ports of the magazines 34a, 34b. The tube sections 48a, 48b may be connected to applicable feed hoses 62a, 62b.

Figure 5:
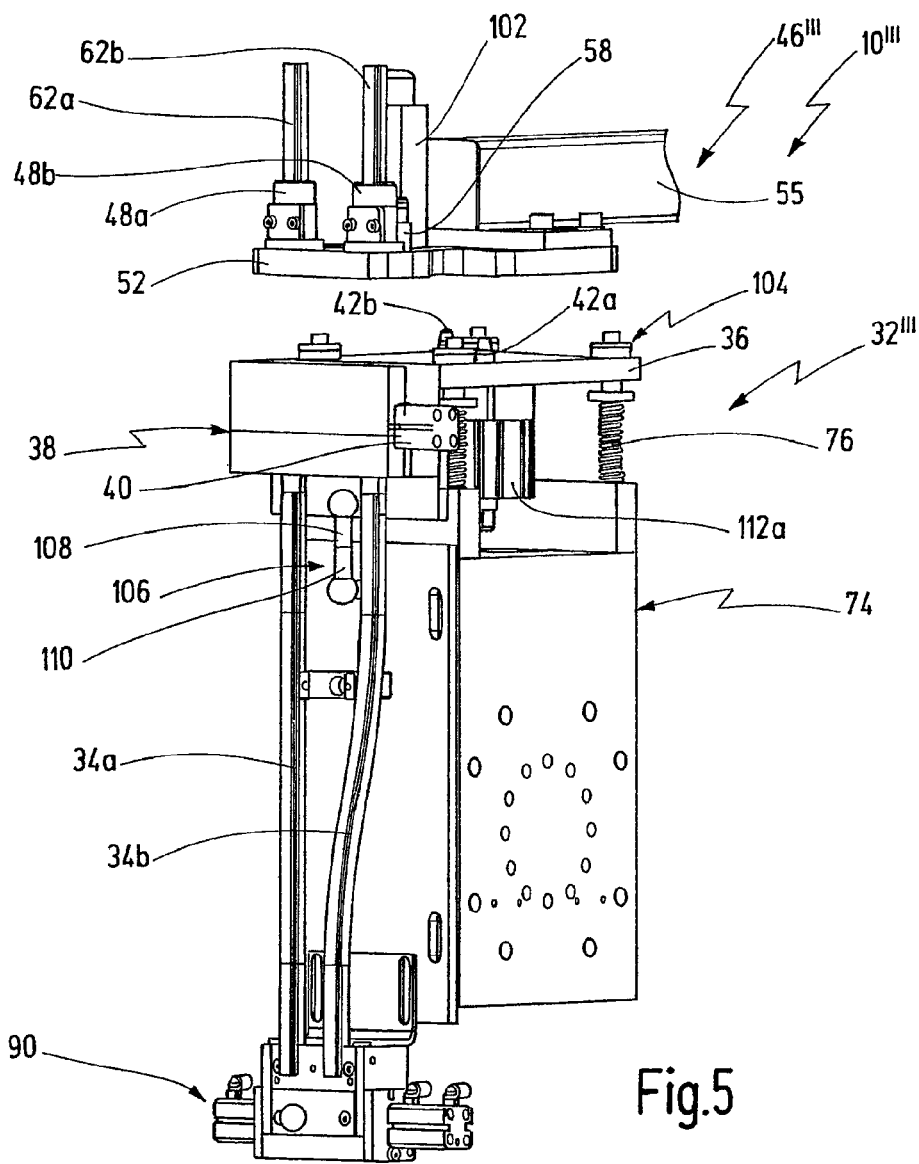
FIG. 5 a perspective view of another embodiment of a section of a fastening system.
Figure 6:
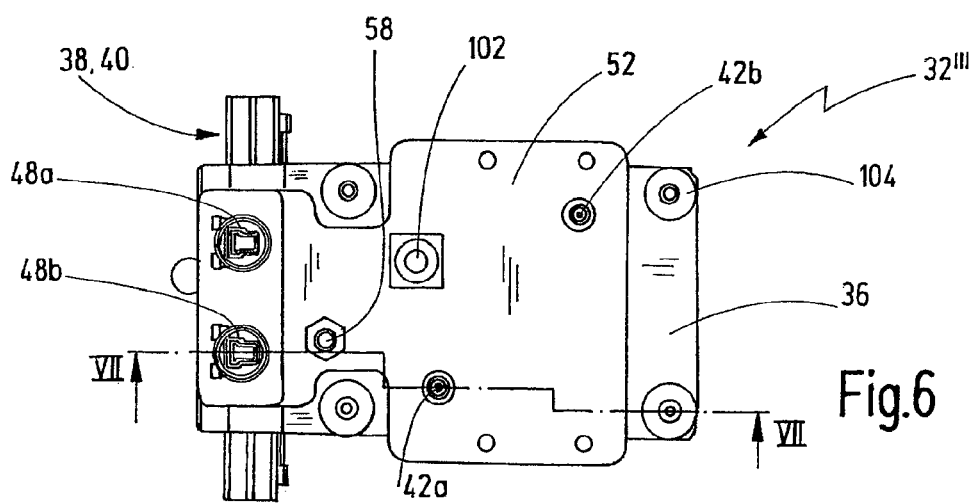
FIG. 6 a top view of the arrangement shown in FIG. 5.

FIG. 5 shows that a limit switch 102 may be provided on the filling station 46''' next to the sensor arrangement 58 that detects the approach of the magazine to the filling station 46'''. The limit switch 102 detects when the magazine has reached the filling station 46''', in particular that the magazine plate 36 is touching the filling station plate 52. The limit switch 102 can be used as described above to close the feed device 60, in particular a blow valve in the compressed air system 68, when the magazine is not located at the filling station 46'''. In this way, it is possible to prevent unintentional ejection of fasteners out of the compressor air system.

Also shown in FIGS. 5 through 8 is that the magazine plate 36 can be mounted to be axially movable with respect to the actuator housing 74 (or a magazine panel) by means of a plurality of retention or guide devices 104. The retention device 104 here includes pins that are rigidly attached to the actuator housing 74 and whose ends bear screws that are not labeled specifically. Due to the screws at the end of the pins, a limit stop, and hence a displacement position, is defined that can be fixed in place by means of a stop mechanism, for instance. In addition, the holding devices each have spherical receptacles for spring pressure elements so that a certain angle compensation can take place between the magazine plate 36 and the actuator housing 74.

In addition, the magazine plate with the magazines 34a, 34b rigidly affixed thereto on the one hand, and the actuator housing 74 on the other hand, are coupled to one another by a link 106. The link 106 has a first link part 108, which is rigidly connected to the magazine plate 36, and a second link part 110, which is rigidly connected to the actuator housing 74 (or a magazine panel). The link parts 108, 110 may be connected to one another by an elastic element that is not yet installed in FIG. 8.

Further, the air seal includes a valve function, particularly an air channel 105 that is, in the closed position of the air seal 38 (FIG. 7), connected with a compression air terminal 105a, and that, in the open position of the air seal 38 (FIG. 8), separates the interior of the magazine 34a, 34b from the compression air terminal 105a. As an alternative, a compression air terminal can be connected in a different position with the interior of the magazine 34.

Figure 7:
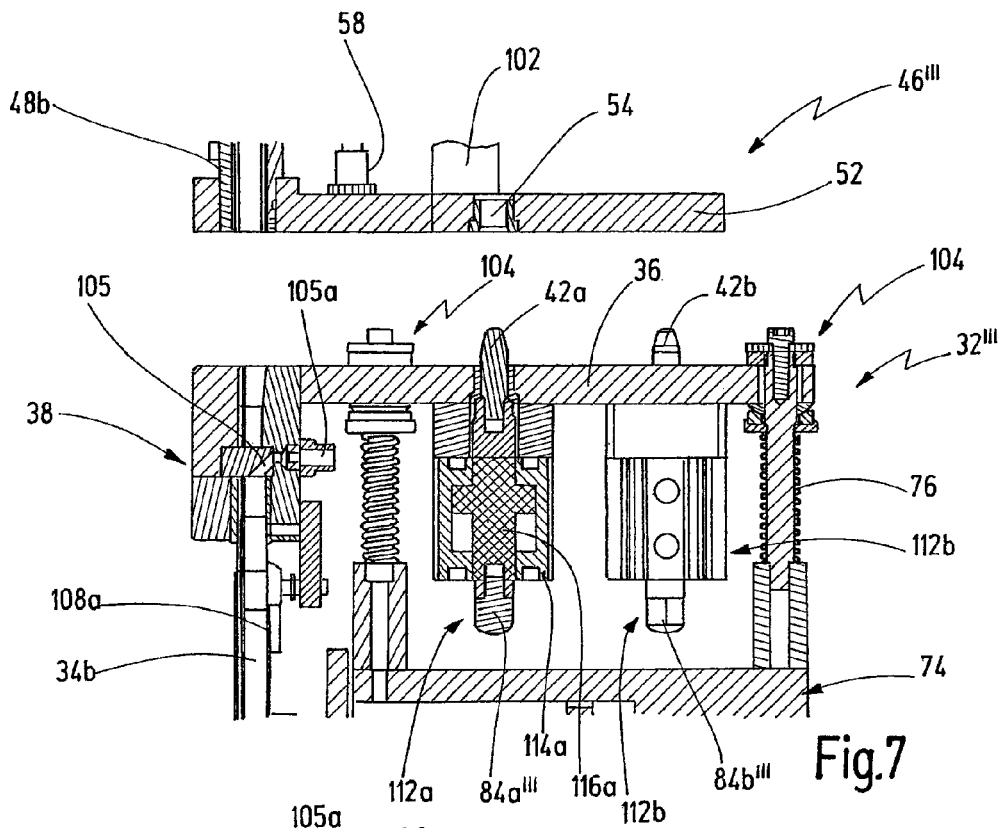
FIG. 7 a cross-sectional view along line VII-VII from FIG. 6, wherein a magazine is approaching a filling station.

The magazine arrangement 32''' differs further from the one in FIG. 3 in that, instead of separate alignment and stop actuators, a combination actuator 112 is provided for each of the alignment pins 42a, 42b and for stop bars 84a''', 84b'''. Each of the combination actuators 112 here is designed as double-acting pneumatic cylinders. A first end of a piston 116 that is movable in a cylinder housing 114 of the combination actuator 112 is connected to the respective alignment pin 42. The axially opposite end of the piston 116 is connected to a stop pin or bar 84'''. In a first position of the combination actuator 112, the alignment pin 42 projects with respect to a contact surface of the magazine plate 36. This position is shown in FIG. 7. In a second position of the combination actuator 112, the respective alignment pin 42 essentially does not project with respect to this contact surface. In contrast, in the second position the stop pin 84''' presses against a top side of a stop plate 118 of the actuator housing 74.

Provided that the magazine arrangement 32''' has moved away from the filling station 46''', the combination actuators 112a, 112b are simultaneously shifted into this second position. In it, the stop pins 84''' press against the stop plate 118, and in doing so press the magazine plate 36 against the limit stops formed by the screws of the holding device 104. In this way, the position of the magazine plate 36 is fixed in place with respect to the actuator housing 74.

Figure 8:
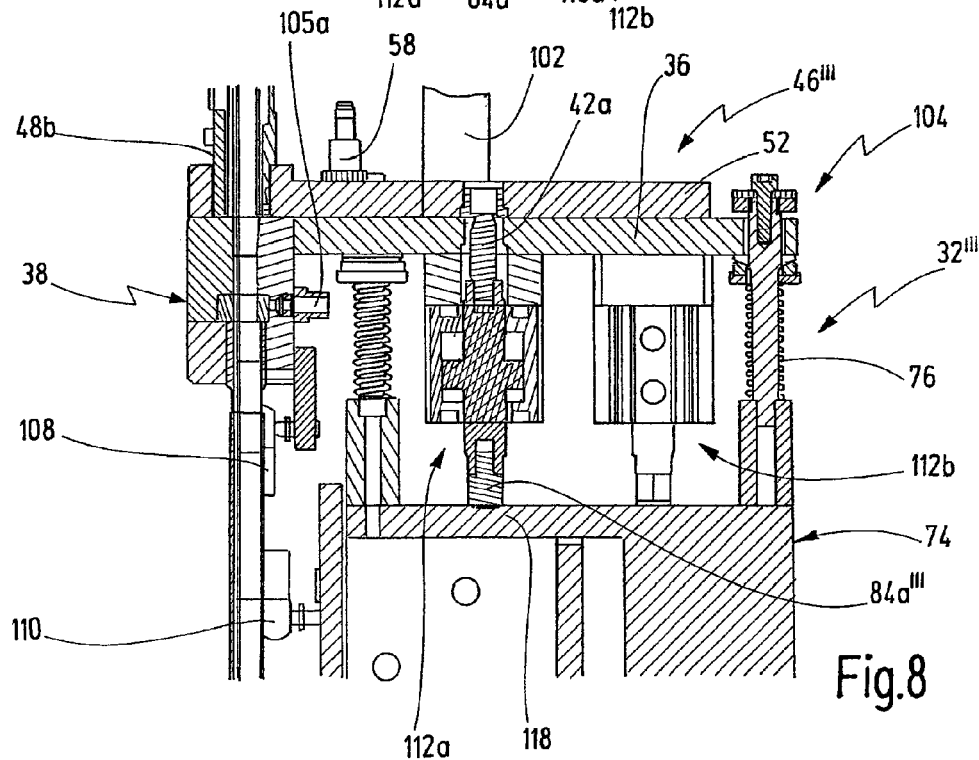
FIG. 8 a representation comparable to FIG. 7, wherein the magazine has reached the filling station and wherein alignment pins are retracted.

FIG. 8 shows a position that represents a sort of intermediate position. Here, the combination actuator 112 presses the stop pin 84''' against the stop plate 118, thereby supporting the action of the springs 76. However, the second position has not yet been fully reached here, since the magazine plate 36 is not yet resting against the limit stop of the holding device 104. Rather, the magazine plate 36 is contacting the filling station plate 52.

When the magazine arrangement 32''' leaves the position at the filling station 46''' shown in FIG. 8, the magazine plate 36 is forced against the limit stop by the existing pressure in the combination actuator 112, in order to fix the magazine plate 36 in place in this way.

The invention claimed is:

1. A method for feeding fasteners to a fastening tool that is movable by a programmable handling device and on which is mounted a magazine for accommodating at least one fastener the method comprising:
    moving the magazine to a filling station, wherein the filling station has an always continuously open tube section with an outlet opening;
    orienting the magazine with respect to the outlet opening;
    opening an air seal of the magazine; and
    conveying at least one fastener to the tube section in such a manner that the fastener travels through the tube section and the outlet opening to reach the magazine,
    wherein the outlet opening is unblocked before orienting the magazine and after conveying the fastener to the magazine.

2. The method according to claim 1, wherein a sensor arrangement is used to detect whether the magazine has approached an exit port defined by the outlet opening, and wherein the conveying is only initiated when the magazine has approached the exit port.

3. The method according to claim 1, wherein a switch is used to detect whether the magazine has reached the filling station, and wherein the conveying is only initiated when the magazine has reached the filling station.

4. The method according to claim 1, wherein an alignment of the magazine with respect to an exit port defined by the outlet opening includes inserting at least one alignment pin of the magazine in an alignment opening of the filling station.

5. The method according to claim 4, wherein the alignment pin is withdrawn out of the alignment opening before the air seal of the magazine is opened.

6. The method according to claim 4, wherein the magazine is movably mounted with respect to the fastening tool and wherein the alignment of the magazine with respect to the exit port includes moving the magazine with respect to the fastening tool.

7. The method according to claim 6, wherein the magazine is preloaded in one direction of displacement with respect to the fastening tool and wherein the aligning of the magazine relative to the exit port includes moving the magazine against the preloading with respect to the fastening tool, so that the magazine can be held by the programmable handling device and the preloading force with respect to the filling station while the fastener is traveling from the tube section into the magazine.

8. The method according to claim 6, wherein the magazine can be fixed in a displacement position relative to the fastening tool by means of a stop mechanism.

9. The method according to claim 8, wherein a stop pin is attached to the alignment pin.

10. A fastening device, comprising:
    a fastening tool that is movable by a programmable handling device,
    a magazine mounted on the fastening tool for accommodating at least one fastener, wherein the magazine has an inlet port and at least one closure element that is an air seal,
    a filling station that has a feed port that can be aligned with a feed device for feeding at least one fastener at a time and that has an exit port having a shape of an outlet opening through which the fasteners can be fed to the magazine,
    wherein the feed device is set up to feed at least one fastener to the filling station when the inlet port of the magazine is aligned with the exit port and when the closure element is open, wherein the filling station has a permanent continuously open tube section from the feed port to the exit port so that the outlet opening is unblocked before aligning the magazine with the exit port and after conveying the fastener to the magazine.

11. The fastening device according to claim 10, wherein a sensor arrangement which detects whether the magazine has approached the filling station is located on the filling station.

12. The fastening device according to claim 10, wherein a switch that is actuated when the magazine has reached the filling station is located on the filling station.

13. The fastening device according to claim 10, wherein the magazine is movably mounted with respect to the fastening tool.

14. The fastening device according to claim 13, wherein the magazine is elastically preloaded in one direction of displacement in such a manner that a magazine plate is pressable against a filling station plate when the exit port is aligned with the inlet port in order to hold the relative position between the magazine and the filling station while at least one fastener is being fed through the tube section into the magazine.

15. The fastening device according to claim 13, wherein the magazine is capable of being fixed in a displacement position relative to the fastening tool by means of a stop mechanism.

16. The fastening device according to claim 10, wherein the closure element of the magazine is capable of being actuated by an electrically drivable air seal actuator.

17. The fastening device according to claim 10, wherein at least one alignment pin is mounted on a magazine plate of the magazine, which at least one alignment pin is insertable in an associated alignment opening of the filling station in order to align the magazine and the filling station with one another.

18. The fastening device according to claim 17, wherein the alignment pin is movable by an electrically operated alignment actuator between a first position in which it projects relative to a contact surface of the magazine plate, and a second position in which it essentially does not project relative to the contact surface.

19. The fastening device according to claim 18, wherein the alignment pin is connected to a stop pin that fixes the magazine in place with respect to the fastening tool when the alignment pin is in the second position.

20. A method for feeding fasteners to a fastening tool that is movable by a programmable handling device and on which is mounted a magazine for accommodating at least one fastener the method comprising:
moving the magazine to a filling station, wherein the filling station has an always continuously open tube section with an outlet opening;
orienting the magazine with respect to the outlet opening;
opening an air seal of the magazine; and
conveying at least one fastener to the tube section in such a manner that the fastener travels through the tube section and the outlet opening to reach the magazine,
wherein an alignment of the magazine with respect to an exit port defined by the outlet opening includes inserting at least one alignment pin of the magazine in an alignment opening of the filling station, and
wherein the alignment pin is withdrawn out of the alignment opening before the air seal of the magazine is opened.

21. The method according to claim 20, wherein a sensor arrangement is used to detect whether the magazine has approached the exit port, and wherein the conveying is only initiated when the magazine has approached the exit port.

22. The method according to claim 20, wherein a switch is used to detect whether the magazine has reached the filling station, and wherein the conveying is only initiated when the magazine has reached the filling station.

23. The method according to claim 20, wherein the magazine is movably mounted with respect to the fastening tool and wherein the alignment of the magazine with respect to the exit port includes moving the magazine with respect to the fastening tool.

24. The method according to claim 23, wherein the magazine is preloaded in one direction of displacement with respect to the fastening tool and wherein the aligning of the magazine relative to the exit port includes moving the magazine against the preloading with respect to the fastening tool, so that the magazine can be held by the programmable handling device and the preloading force with respect to the filling station while the fastener is traveling from the tube section into the magazine.

25. The method according to claim 24, wherein the magazine can be fixed in a displacement position relative to the fastening tool by means of a stop mechanism.

26. The method according to claim 25, wherein a stop pin is attached to the alignment pin.

27. A fastening device, comprising:
a fastening tool that is movable by a programmable handling device,
a magazine mounted on the fastening tool for accommodating at least one fastener, wherein the magazine has an inlet port and at least one closure element that is an air seal,
a filling station that has a feed port that can be aligned with a feed device for feeding at least one fastener at a time and that has an exit port having a shape of an opening through which the fasteners can be fed to the magazine,
wherein the feed device is set up to feed at least one fastener to the filling station when the inlet port of the magazine is aligned with the exit port and when the closure element is open,
wherein the filling station has a permanent continuously open tube section from the feed port to the exit port,
wherein at least one alignment pin is mounted on a magazine plate of the magazine, which at least one alignment pin is insertable in an associated alignment opening of the filling station in order to align the magazine and the filling station with one another, and
wherein the alignment pin is movable by an electrically operated alignment actuator between a first position in which it projects relative to a contact surface of the magazine plate, and a second position in which it essentially does not project relative to the contact surface.

28. The fastening device according to claim 27, wherein a sensor arrangement which detects whether the magazine has approached the filling station is located on the filling station.

29. The fastening device according to claim 27, wherein a switch that is actuated when the magazine has reached the filling station is located on the filling station.

30. The fastening device according to claim 27, wherein the magazine is movably mounted with respect to the fastening tool.

31. The fastening device according to claim 30, wherein the magazine is elastically preloaded in one direction of displacement in such a manner that a magazine plate is pressable against a filling station plate when the exit port is aligned with the inlet port in order to hold the relative position between the magazine and the filling station while at least one fastener is being fed through the tube section into the magazine.

32. The fastening device according to claim 30, wherein the magazine is capable of being fixed in a displacement position relative to the fastening tool by means of a stop mechanism.

33. The fastening device according to claim 27, wherein the closure element of the magazine is capable of being actuated by an electrically drivable air seal actuator.

* * * * *